US012752794B2

(12) United States Patent
Ishikawa et al.

(10) Patent No.: US 12,752,794 B2
(45) Date of Patent: Oct. 6, 2026

(54) VEHICLE

(71) Applicant: KAWASAKI MOTORS, LTD., Hyogo (JP)

(72) Inventors: Shuhei Ishikawa, Kobe (JP); Taichi Inaba, Kobe (JP); Kazuya Nagasaka, Kobe (JP); Toru Minami, Akashi (JP); Takahiro Yano, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 179 days.

(21) Appl. No.: 18/675,993

(22) Filed: May 28, 2024

(65) Prior Publication Data

US 2025/0368207 A1 Dec. 4, 2025

(51) Int. Cl.
*B60W 40/10* (2012.01)
*B60W 40/105* (2012.01)

(52) U.S. Cl.
CPC ....... *B60W 40/105* (2013.01); *B60W 2520/10* (2013.01); *B60W 2520/14* (2013.01); *B60W 2720/28* (2013.01)

(58) Field of Classification Search
CPC ........... B60W 40/105; B60W 2520/10; B60W 2520/14; B60W 2720/28
See application file for complete search history.

(56) References Cited

U.S. PATENT DOCUMENTS

2004/0079145 A1* 4/2004 Kin ........................ B60C 23/061 73/146
2021/0129904 A1* 5/2021 Manji .................. B62D 11/003
2022/0258603 A1* 8/2022 Hiroi ......................... B60K 5/04
2023/0406308 A1* 12/2023 Yamamoto ...... B60W 30/18009
2025/0249755 A1* 8/2025 Koga ........................ B60L 3/00

FOREIGN PATENT DOCUMENTS

JP 2009060769 A * 3/2009
JP 2010023734 A * 2/2010
JP 2023-78276 6/2023
KR 20170064282 A * 6/2017 .......... B60W 40/114
WO WO-2024100957 A1 * 5/2024 ............... B62D 6/00

* cited by examiner

*Primary Examiner* — Mary Cheung
(74) *Attorney, Agent, or Firm* — Wenderoth, Lind & Ponack, LLP

(57) ABSTRACT

A vehicle includes a speed detector that detects a traveling speed of the vehicle in a horizontal direction, a yaw rate detector that detects a yaw rate about a vertical direction of the vehicle, a driving source, and a left driving wheel and a right driving wheel to which a driving force from the driving source is transmitted, and that rotate independently from each other. The vehicle further includes a control circuit including a rotational speed estimator that estimates an actual rotational speed of the left driving wheel and an actual rotational speed of the right driving wheel, on the basis of the traveling speed detected by the speed detector, and the yaw rate detected by the yaw rate detector. The speed detector is a position information obtainer that obtains position information of at least two different locations of the vehicle in the horizontal direction. The yaw rate detector is an Inertial Measurement Unit that detects an angular acceleration about the vertical direction of the vehicle.

11 Claims, 6 Drawing Sheets

VEHICLE

BACKGROUND

Technical Field

The present disclosure relates to a vehicle.

Related Art

JP 2023-78276 A discloses a utility vehicle that moves straight and makes turns autonomously.

SUMMARY

The utility vehicle disclosed in JP 2023-78276 A includes a position information obtainer that obtains information of the current position of the vehicle body, and a rotational speed sensor that detects the rotational speed of a wheel, for the purpose of moving autonomously. As such a rotational speed sensor, an optical sensor is often used, but an optical sensor is relatively expensive. Therefore, there is room for improvement from the viewpoint of further reducing the cost of the vehicle for autonomous driving.

An object of the present disclosure is to provide a vehicle capable of estimating the rotational speed of a driving wheel without using a rotational speed sensor.

The present disclosure provides a vehicle including:

- a speed detector that detects a traveling speed of the vehicle in a horizontal direction;
- a yaw rate detector that detects a yaw rate about a vertical direction of the vehicle;
- a driving source;
- a left driving wheel and a right driving wheel to which a driving force from the driving source is transmitted, and that rotate independently from each other; and
- a control circuit including a rotational speed estimator that estimates an actual rotational speed of the left driving wheel and an actual rotational speed of the right driving wheel, based on the traveling speed detected by the speed detector, and the yaw rate detected by the yaw rate detector.

With the vehicle according to the present disclosure, the actual rotational speeds of the left driving wheel and the right driving wheel are estimated on the basis of the traveling speed and the yaw rate. As a result, when the vehicle is caused to move autonomously on the basis of the rotational speed of the driving wheels, it is not necessary to mount a rotational speed sensor either on the left driving wheel or the right driving wheel. Therefore, the cost of the vehicle can be reduced.

BRIEF DESCRIPTION OF THE DRAWINGS

The foregoing and the other features of the present disclosure will become apparent from the following description and drawings of an illustrative embodiment of the disclosure in which.

DETAILED DESCRIPTION

An embodiment of the present disclosure will now be described with reference to drawings.

Figure 1:
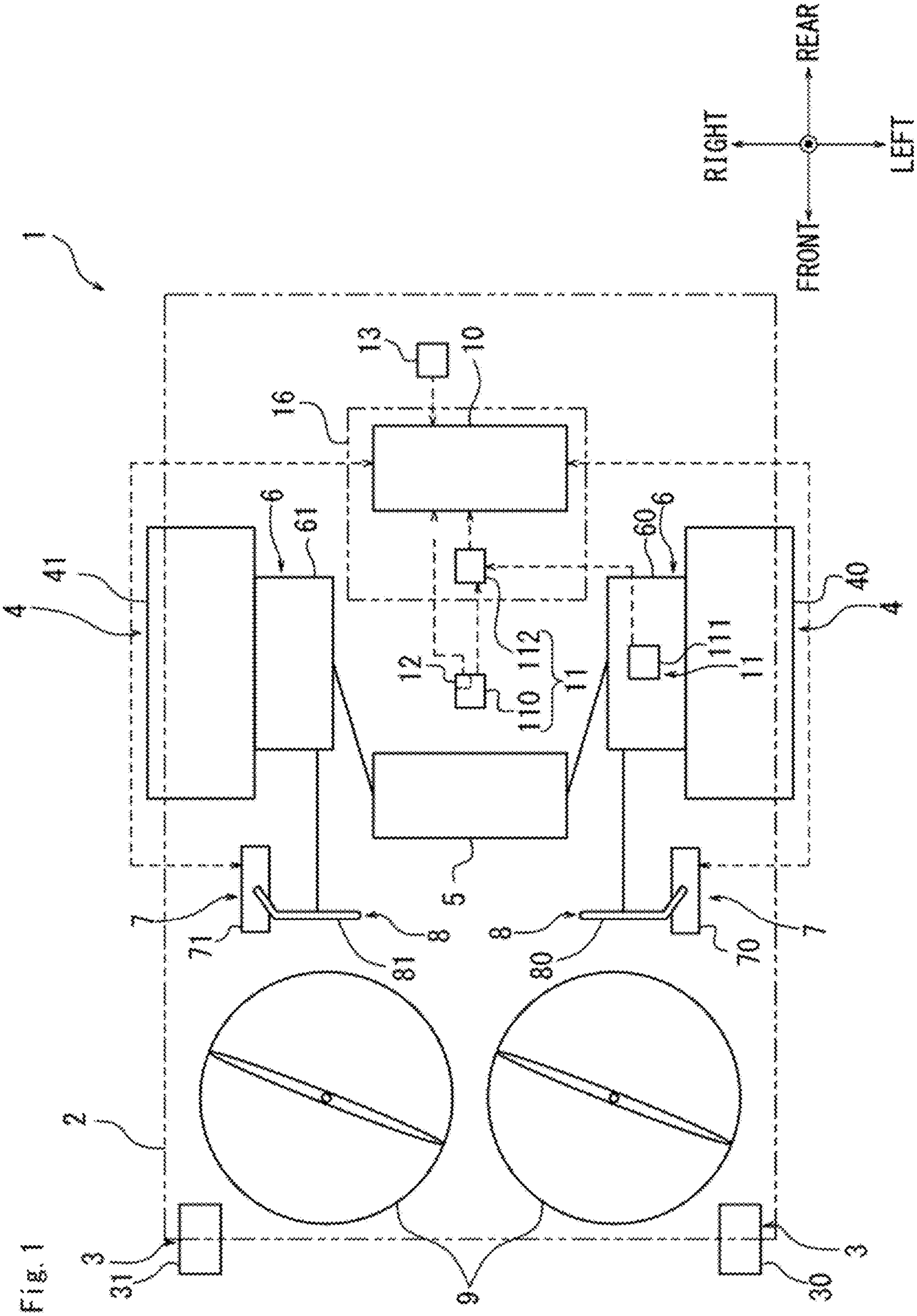
FIG. 1 is a schematic plan view of a vehicle according to the present embodiment.

FIG. 1 illustrates a schematic plan view of a vehicle 1 according to the embodiment. In the following description, "front", "rear", "left", and "right" corresponds to the front side, the rear side, the left side, and the right side, as viewed from an operator onboard the vehicle 1, respectively. "Upper" and "lower" correspond to the vertical directions of the vehicle 1. In the present embodiment, the vehicle 1 is an automatic lawn mower. The vehicle may be a vehicle in which left driving wheel and the right driving wheel rotate independently, such as an agricultural vehicle (such as a rice-planting machine, a tractor, or a combine harvester) or a construction vehicle (such as a hydraulic excavator and a jaw crusher).

The vehicle 1 includes a vehicle body 2, a driving source 5 provided to the vehicle body 2, front wheels 3 and rear wheels 4, a transmission 6 that transmits the driving force from the driving source 5, lawn mowing units 9, and a control circuit 10 that controls traveling of the vehicle 1. The front wheels 3 include a front left wheel 30 and a front right wheel 31 disposed on the left and the right sides of the vehicle body 2, respectively. The rear wheels 4 are driving wheels (hereinafter, referred to as driving wheels 4) to which the driving force is transmitted by the transmission 6. The driving wheel 4 includes a left driving wheel 40 and a right driving wheel 41 disposed on the left side and right side of the vehicle body 2, respectively. In another embodiment, the transmission may transmit the driving force to the front wheels 3. The driving force of the driving source 5 may also be used for driving (e.g., rotating) the lawn mowing units 9.

The transmission 6 includes a left transmission 60 for transmitting the driving force to the left driving wheel 40, and a right transmission 61 for transmitting the driving force to the right driving wheel 41. The transmissions 60, 61 are both connected to the driving source 5. In the present embodiment, the driving source 5 is an engine. A rotational input at a predetermined torque generated by the driving source 5 is transmitted to each of the transmissions 60, 61, and each of the transmissions 60, 61 converts the rotational input into a desired rotational output. The transmissions 60, 61 transmit the rotational output to the driving wheels 40, 41, respectively, whereby causing each of the driving wheels 40, 41 to rotate independently from the other at a desired rotational speed.

In the present embodiment, the transmission 6 is a static hydraulic continuously variable transmission, that is, what is called a hydro static transmission (HST).

The vehicle 1 includes a manipulator 8 for controlling actual rotational speeds of the driving wheels 4. The actual rotational speeds herein are actual rotational speeds of the respective driving wheels 4. The manipulator 8 includes a left manipulator 80 that controls the actual rotational speed of the left driving wheel 40, and a right manipulator 81 that controls the actual rotational speed of the right driving wheel 41. In the present embodiment, the manipulators 80, 81 are levers extending upwards from the vehicle body 2 (see FIG.

2). The left manipulator 80 and the right manipulator 81 are connected to the left transmission 60 and the right transmission 61, respectively. Each of the manipulator 80, 81 is pivotable about a pivot center P1 (see FIG. 6) of the manipulator 80, 81, in the front-rear directions. When the manipulator 80, 81 is pivoted in the front-rear directions, the actual rotational speed of the corresponding driving wheel 40, 41 is changed, respectively, via the corresponding transmission 60, 61.

In the vehicle 1 according to the present embodiment, by operating the manipulators 80, 81 independently, the driving wheels 40, 41 are caused to rotate independently in accordance with the operated amount, so that the vehicle 1 can move in the front-rear directions and the left-right directions. The operated amount herein is an angle by which the manipulator 8 is pivoted. As one example, when the manipulators 80, 81 are operated by the same operated amount in the same direction, the vehicle 1 moves forwards or backwards, at a predetermined speed. As another example, when the left manipulator 80 is pivoted forwards by a predetermined operated amount, and the right manipulator 81 is pivoted forwards by an operated amount less than the operated amount by which the left manipulator 80 is pivoted, the vehicle 1 makes a right turn at a predetermined yaw rate. The yaw rate herein is a speed at which the vehicle 1 makes a turn about a vertical direction that passes through the midpoint between the center of the left driving wheel 40 and the center of the right driving wheel 41.

The vehicle 1 includes an actuator 7 for causing the manipulator 8 to operate. The actuator 7 includes a left actuator 70 for operating the left manipulator 80, and a right actuator 71 for operating the right manipulator 81. The actuators 70, 71 are connected directly or indirectly to the respective manipulators 80, 81 (see FIG. 6).

The actuator 7 according to the present embodiment is an electric linear actuator, and is operated (moved) forwards or backwards at a predetermined speed, by receiving power supply. The actuator used in the vehicle 1 may also be another type of actuator, such as an electromagnetic actuator, a pneumatic actuator, or a hydraulic actuator.

When the actuator 7 is operated forwards or backwards by a predetermined operated amount, the manipulator 8 connected to the actuator 7 is pivoted forwards or backwards by a predetermined operated amount. In the example illustrated in FIG. 6, for example, when the actuator 7 is operated backwards by a predetermined operated amount, the manipulator 8 is pivoted forwards by a predetermined operated amount. The position where the actuator 7 is mounted on the manipulator 8 is not limited to the configuration illustrated in FIG. 6.

The actuators 70, 71 are electrically connected to the control circuit 10. Each of the actuators 70, 71 is enabled to operate by a predetermined operated amount, by receiving a command from the control circuit 10. In this manner, the vehicle 1 according to the present embodiment can move autonomously without any operator manually operating the manipulator 8.

The vehicle 1 includes a position information obtainer 11 that obtains position information of the vehicle 1 in the horizontal direction. The position information obtainer 11 can detect the position information, the traveling speed, and the traveling direction of the vehicle 1 using a global positioning system (GPS) or a global navigation satellite system (GNSS), for example.

The position information obtainer 11 includes a first obtainer 110 that obtains first position information of the vehicle 1 and a second obtainer 111 that obtains second position information of the vehicle 1. The first position information and the second position information are information indicating positions of two different locations of the vehicle 1 in the horizontal direction. In other words, the first position information is position information of the first obtainer 110, and the second position information is position information of the second obtainer 111. The first obtainer 110 and the second obtainer 111 are what is called antennas. The first obtainer 110 and the second obtainer 111 receive a signal transmitted from a GPS satellite or the like.

In the present embodiment, the first obtainer 110 is provided at the midpoint between the left driving wheel 40 and the right driving wheel 41. In other words, the first obtainer 110 is provided at a rotation center of the vehicle 1 in the horizontal direction (that is, on the vertical axis passing through the midpoint between the center of the left driving wheel 40 and the center of the right driving wheel 41). The second obtainer 111 is provided in a manner horizontally separated from the first obtainer 110. In the present embodiment, the second obtainer 111 is provided nearer to the left driving wheel 40, with respect to the first obtainer 110.

In order to detect the traveling direction of the vehicle 1 more accurately, it is preferable to keep the distance between the first obtainer 110 and the second obtainer 111 as far as possible. For example, the second obtainer 111 is preferably separated from the first obtainer 110 by 0.15 m to 2 m in the horizontal direction.

In order to detect the traveling speed and the traveling direction accurately even when the vehicle 1 is inclined forwards, backwards, leftwards, or rightwards, the first obtainer 110 and the second obtainer 111 are preferably installed at same height of the vehicle 1 in the vertical direction. If the first obtainer 110 and the second obtainer 111 are installed at different heights, the change in the relative positions of the first obtainer 110 and the second obtainer 111 will be greater when the vehicle 1 becomes inclined, than when the first obtainer 110 and the second obtainer 111 are installed at the same height.

Figure 2:
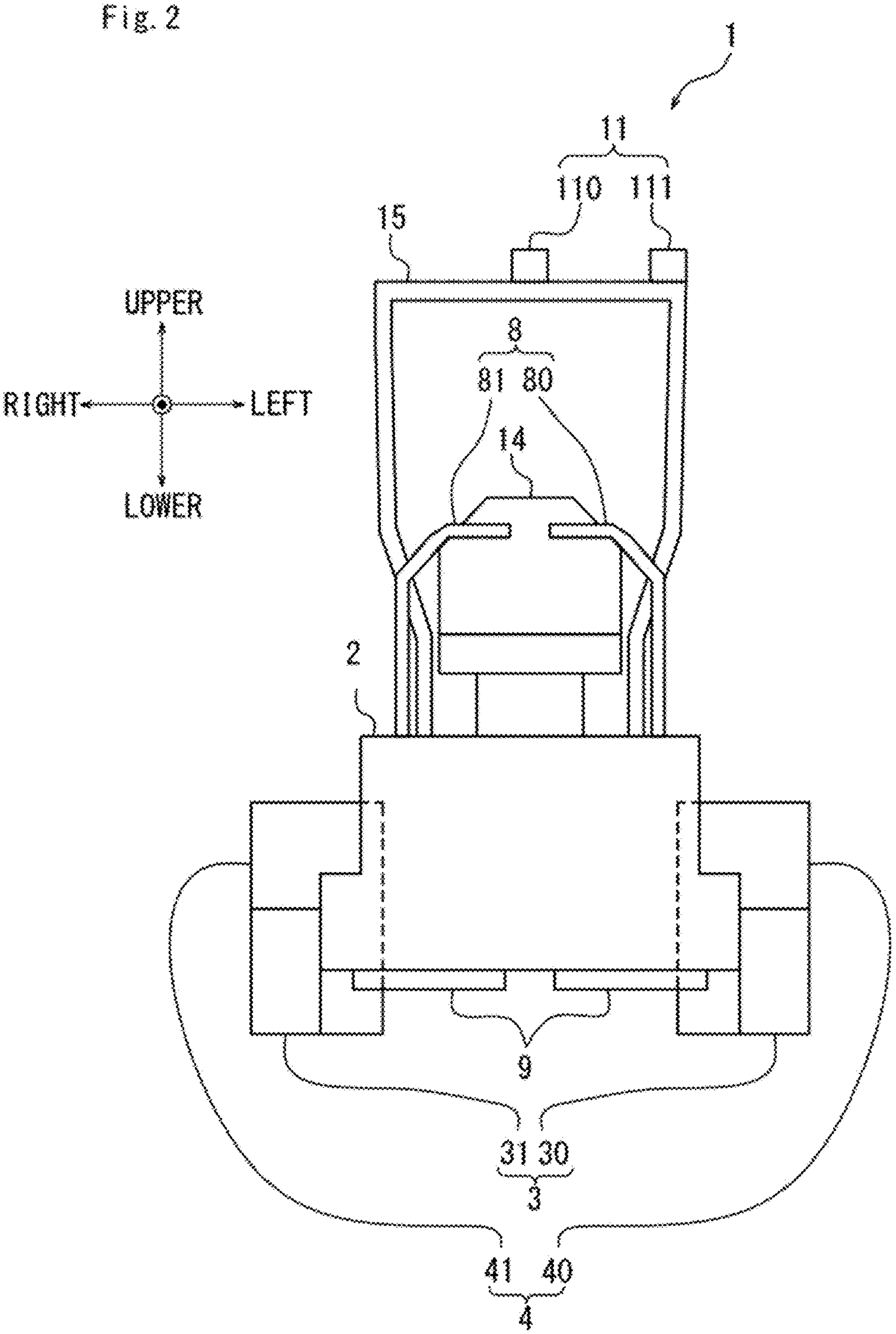
FIG. 2 is a schematic front view of the vehicle according to the present embodiment.

FIG. 2 illustrates a schematic front view of the vehicle 1. In FIG. 2, the vehicle 1 includes a seat 14 where the operator is seated, and a bar 15 for protecting the operator when the vehicle 1 trips to the ground. The bar 15 has an inverted "U" shape extending across above the seat 14, and has its ends connected to the left and the right sides of the vehicle body 2, respectively. In the present embodiment, the first obtainer 110 and the second obtainer 111 are provided on the bar 15 extending across above the seat 14. There are no other components of the vehicle 1 above the first obtainer 110 and the second obtainer 111. Therefore, the first obtainer 110 and the second obtainer 111 can better receive the signals transmitted from GPS satellites or the like.

The position information obtainer 11 includes a processor 112 that detects the traveling speed of the vehicle 1 on the basis of the first position information and the second position information. The processor 112 is electrically connected to the first obtainer 110, the second obtainer 111, and the control circuit 10. The processor 112 is a circuit including an RF front end and the like.

The processor 112 receives the first position information from the first obtainer 110, and calculates the position of the first obtainer 110 in the horizontal direction (referred to as a first position). The processor 112 also receives the second position information from the second obtainer 111, and calculates the position of the second obtainer 111 in the horizontal direction (referred to as a second position). The processor 112 calculates the first position and the second position at predetermined time intervals (e.g., at intervals of 0.01 seconds). The processor 112 detects the traveling speed of the vehicle 1 on the basis of a time-series change in the calculated first position. Because the first obtainer 110 is provided at the rotation center of the vehicle 1, the traveling speed can be detected only on the basis of the information of the first position.

The processor 112 detects the traveling direction of the vehicle 1 on the basis of the calculated first position and second position. Information related to the direction in which the vehicle 1 travels is incorporated in the processor 112 in advance. This traveling direction is determined on the basis of the relative position between the first position and the second position. The processor 112 then detects the traveling direction of the vehicle 1 on the basis of a change in the relative position between the first position and the second position.

In this manner, the position information obtainer 11 can detect the traveling speed of the vehicle 1, on the basis of the position information of two different locations of the vehicle 1 in the horizontal direction. Therefore, the position information obtainer 11 according to the present embodiment can function as a speed detector of the vehicle 1. The method for detecting the traveling speed using the position information obtainer 11 is one preferable means for detecting the traveling speed.

The vehicle 1 includes an Inertial Measurement Unit 12 that detects angular acceleration about the rotation center of the vehicle 1. The Inertial Measurement Unit 12 is a yaw rate sensor that measures an angular acceleration of the vehicle 1 in the left-right directions. In the present embodiment, the Inertial Measurement Unit 12 is provided at the same position as the first obtainer 110 in the horizontal direction of the vehicle 1, that is, at the rotation center of the vehicle 1. The position of the Inertial Measurement Unit 12 in the vertical direction may be the same as that of the first obtainer 110, but is not limited thereto. For example, the Inertial Measurement Unit 12 may be provided below the seat 14. The Inertial Measurement Unit 12 is electrically connected to the control circuit 10.

The control circuit 10 detects the yaw rate of the vehicle 1 on the basis of the angular acceleration of the vehicle 1, measured by the Inertial Measurement Unit 12. Specifically, the yaw rate, that is, the angular velocity is detected by calculating an integral of time-series measurements of the angular acceleration.

In this manner, the Inertial Measurement Unit 12 can detect the yaw rate of the vehicle 1. Therefore, the Inertial Measurement Unit 12 according to the present embodiment can function as a yaw rate detector of the vehicle 1. This method for detecting the yaw rate using the Inertial Measurement Unit 12 is one preferable means for detecting the yaw rate.

The vehicle 1 includes a path information inputter 13 for inputting path information of the vehicle 1 to the control circuit 10 in advance. The path information may include a traveling path, a traveling speed, a turning speed of the vehicle 1, a map of the area having the lawn to be mowed, or the like. The path information inputter 13 is electrically connected to the control circuit 10. For example, in response to an operator inputting the path information to the path information inputter 13, the control circuit 10 receives the input of the path information. In another embodiment, the path information inputter 13 in the vehicle 1 may be omitted. In such a case, for example, an operator may input the path information to a path information inputter (e.g., a PC) deployed at a location away from the vehicle 1, and the path information may be input to the control circuit 10 via a wireless communication unit.

The control circuit 10 includes, for example, a microprocessor as a main component. The control circuit 10 includes a central processing unit (CPU), for example, a memory including a RAM and a ROM, and an input/output interface circuit. The control circuit 10 and the processor 112 described above are housed in a housing case 16 provided on the rear side of the vehicle body 2.

The functions of the elements disclosed herein may be performed using a circuit including a general-purpose processor, a special purpose processor, an integrated circuit, an application-specific integrated circuit (ASIC), a conventional circuit, and/or a combination thereof, or a processing circuit configured to or programmed to perform the functions disclosed herein. A processor is considered as a processing circuit or a circuit, because a processor includes transistors or other circuits. In the present disclosure, a circuit, a unit, or means is either a piece of hardware that performs the functions listed herein, or a piece of hardware programmed to perform the functions listed herein. The hardware may be hardware disclosed herein, or may be any other known hardware that is programmed or configured to perform the functions listed herein. When the hardware is a processor considered as a type of circuit, a circuit, means, or a unit is a combination of hardware and software, and the software is used for configuring the hardware and/or the processor.

The vehicle 1 according to the present embodiment does not have a rotational speed sensor that detects the rotational speed of the driving wheels 4. The rotational speed of the driving wheels 4 is estimated from the data measured by position information obtainer 11 and the Inertial Measurement Unit 12.

A method for estimating the actual rotational speed of the driving wheels 4 will now be described with reference to FIGS. 3 and 4.

Figure 3:
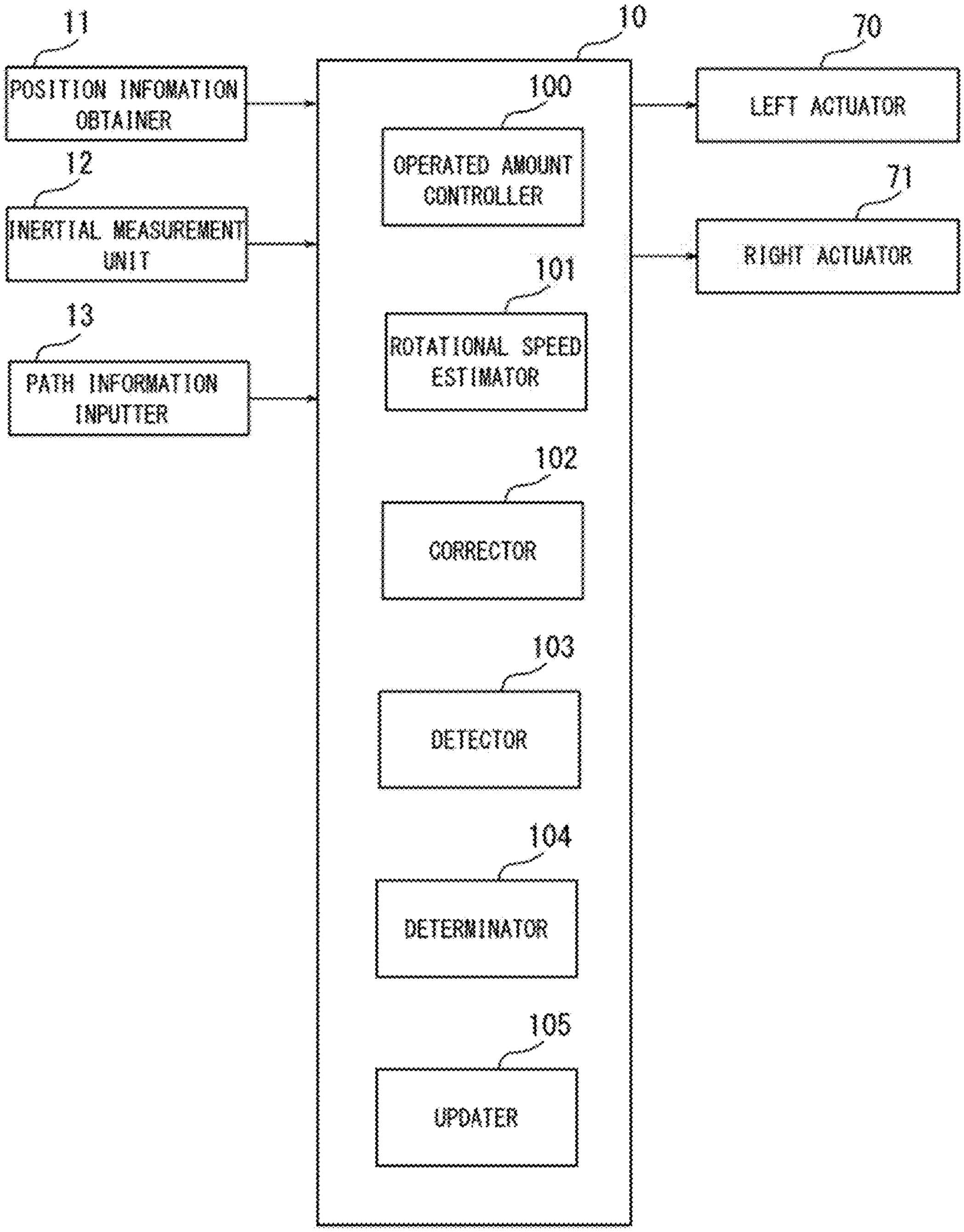
FIG. 3 is a block diagram of a control circuit according to the present embodiment.

FIG. 3 is a block diagram of the control circuit 10 according to the present embodiment. The control circuit 10 includes an operated amount controller 100 that controls the amounts by which the left actuator 70 and the right actuator 71 are to be operated, a rotational speed estimator 101 that estimates the actual rotational speed, and a corrector 102 that corrects the amounts by which the left actuator 70 and the right actuator 71 are operated. The control circuit 10 also includes a detector 103 that detects an angular velocity (that is, a yaw rate), on the basis of the angular acceleration input from the Inertial Measurement Unit 12 described above. The control circuit 10 further includes a determinator 104 that determines the traveling speed and the traveling path of the vehicle 1 on the basis of the path information. The control circuit 10 further includes an updater 105 that updates a correlation map (see FIG. 6) to be described later. The control circuit 10 may also include units other than those described above, such as a controller that controls the power of the lawn mowing units 9. The control circuit 10 stores therein the correlation map (see FIG. 6) of the rotational speed of the driving wheels 4 and the operated amount of the actuator 7.

Figure 4:
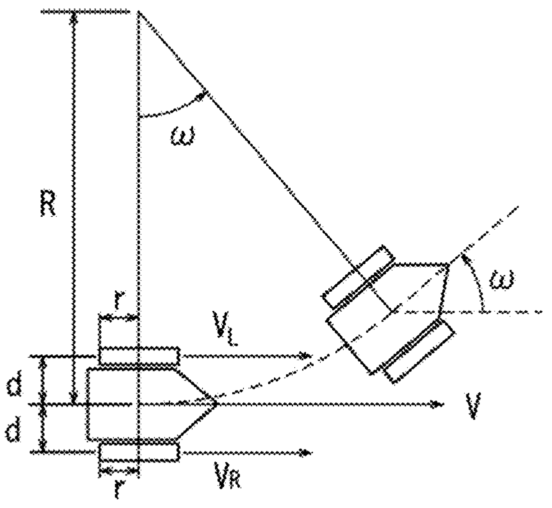
FIG. 4 is a diagram illustrating a relationship between a traveling speed and a yaw rate of the vehicle.

FIG. 4 is a diagram illustrating a relationship between the traveling speed and the yaw rate of the vehicle 1. In FIG. 4, a traveling speed of the vehicle 1 is denoted as V; a circumferential velocity of the left driving wheel 40 and a circumferential velocity of the right driving wheel 41 are denoted as $V_L$ and $V_R$, respectively; a yaw rate is denoted as ω; a radius of a turn is denoted as R; a distance between the center of the vehicle and the driving wheels 40, 41 is denoted as d; and the radius of the left driving wheel 40 and the right driving wheel 41 is denoted as r. The relationships between these parameters and the actual rotational speeds $N_L$ and $N_R$ of the left and right driving wheels 40 and 41 are expressed by the following theoretical formulas (where π in Math. 1 is a circular constant).

$$V = R\omega \quad \text{<Math. 1>}$$

$$V_L = (R - d)\omega$$

$$V_R = (R + d)\omega$$

$$N_L = V_L/(2\pi r)$$

$$N_R = V_R/(2\pi r)$$

Hence, the actual rotational speed $N_L$ of the left driving wheel 40 and the actual rotational speed $N_R$ of the right driving wheel 41 are calculated by the following mathematical formulas.

$$N_L = (V - d\omega)/(2\pi r) \quad \text{<Math. 2>}$$

$$N_R = (V + d\omega)/(2\pi r)$$

In the present embodiment, the traveling speed detected by the position information obtainer 11 is used as the traveling speed V, and the yaw rate detected on the basis of the angular acceleration measured by the Inertial Measurement Unit 12 is used as the yaw rate ω.

As described above, in the present embodiment, the actual rotational speed is estimated on the basis of the detected traveling speed V and the yaw rate ω, the distance d between the center of the vehicle and the driving wheels 40, 41 that are uniquely determined by the specification of the vehicle 1, and the radius r of the left and the right driving wheels 40, 41.

A method for controlling the actual rotational speeds of the driving wheels 40, 41 during the automatic driving of the vehicle 1 according to the present embodiment will now be described with reference to FIGS. 5 and 6.

Figure 5:
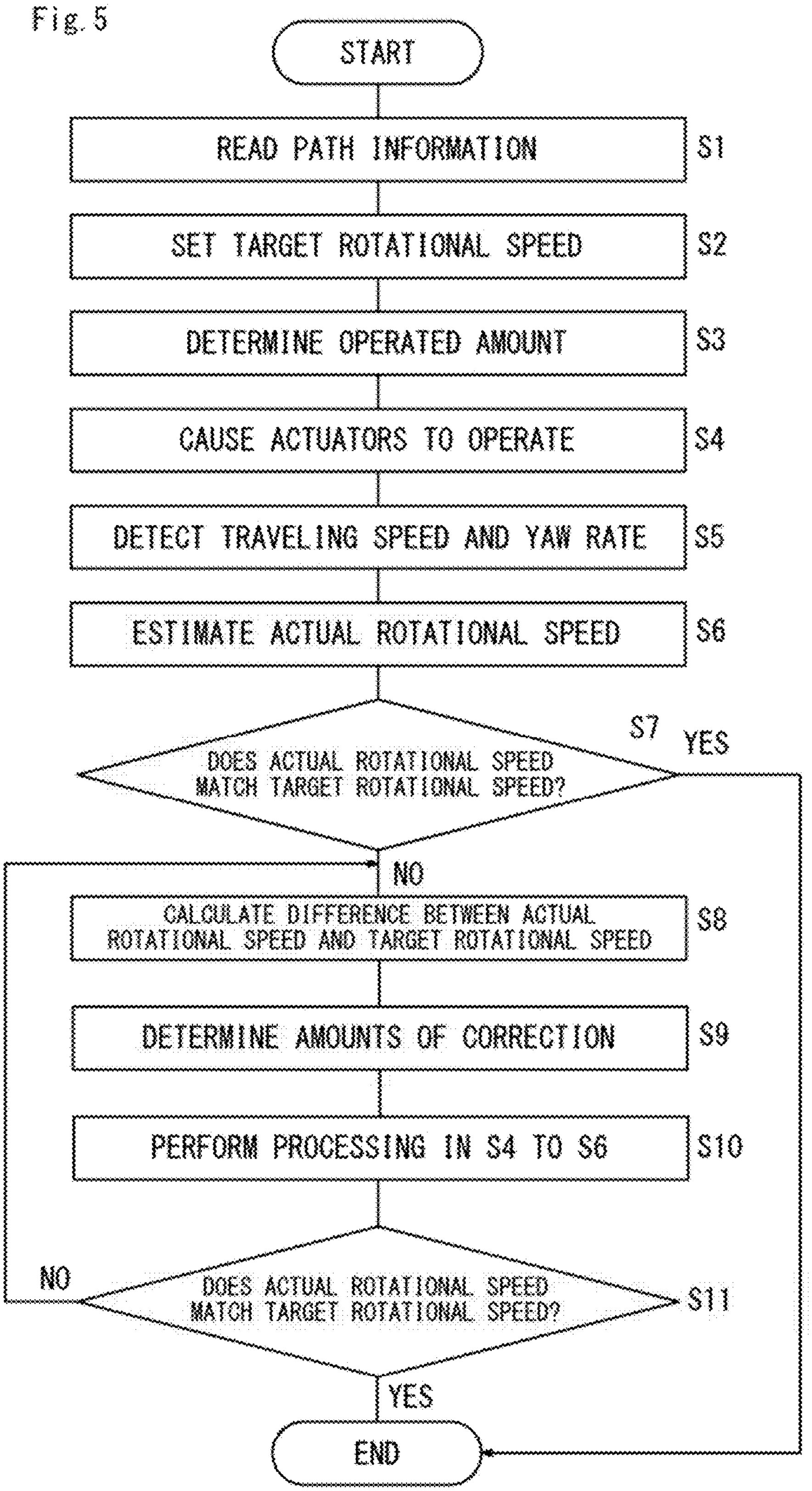
FIG. 5 is a flowchart illustrating an example of an operation of a control circuit according to the present embodiment.

FIG. 5 illustrates a flowchart of the control circuit 10 according to the present embodiment. To begin with, the control circuit 10 reads the path information having been input in advance by an operator (S1). The traveling speed and the traveling path of the vehicle 1 are determined by the determinator 104, on the basis of the read path information (S2). At this time, the target rotational speed of each of the driving wheels 40, 41 is set according to the determined traveling speed and traveling path.

Figure 6:
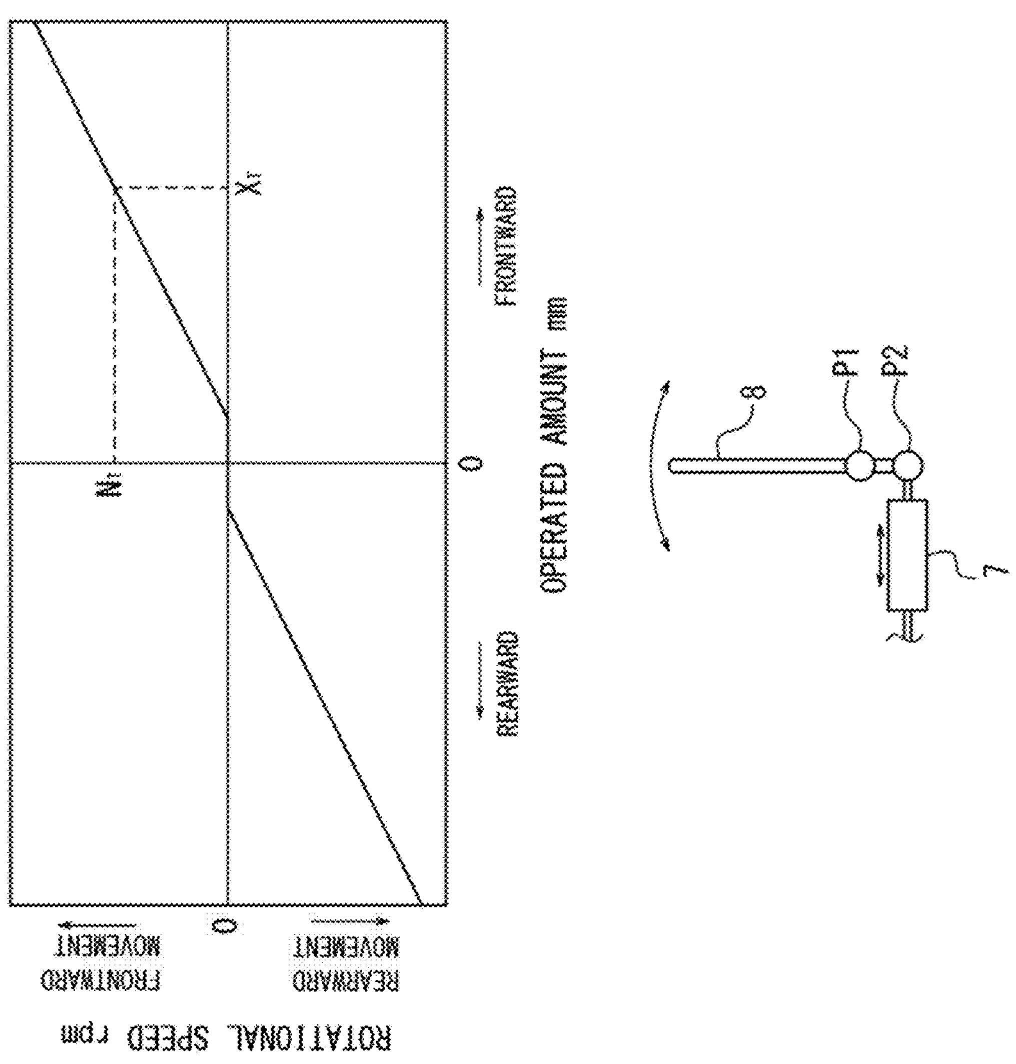
FIG. 6 is a graph illustrating a relationship between the amount by which an actuator according to the present embodiment is operated, and the rotational speed of a driving wheel.

FIG. 6 is a graph illustrating a relationship between the amount by which the actuator 7 is operated, and the rotational speed of a driving wheel 4. That is, the graph illustrated in FIG. 6 is a correlation map of the operated amount and the rotational speed. The vertical axis represents the rotational speed of the driving wheel 4, and the horizontal axis represents the amount by which the actuator 7 is operated. The correlation map is determined in advance, on the basis of factors such as the specifications of the actuator 7 to be used, the position where the actuator 7 is attached to the manipulator 8. For example, according to FIG. 6, to move the vehicle 1 forwards at a target rotational speed of $N_T$ rpm, the actuator 7 is be operated by an amount of $+X_T$ mm. By contrast, when the amount by which the actuator 7 is operated is about 0 mm (e.g., within 30% of the maximum amount by which the actuator 7 is operable), the rotational speed would be 0 rpm in consideration of the play of the manipulator 8.

In the control circuit 10, the amounts by which the respective actuators 70, 71 are to be operated are determined on the basis of the target rotational speed set as mentioned above, and of the correlation map (S3). The operated amount controller 100 in the control circuit 10 then transmits commands for achieving the operated amounts to the respective actuators 70, 71, and the actuators 70, 71 are operated by the respective operated amounts (S4).

As a result of the operations of the actuators 70, 71, the vehicle 1 travels autonomously. While the vehicle 1 is traveling, the traveling speed and the yaw rate are detected on the basis of the data measured by the position information obtainer 11 and the Inertial Measurement Unit 12 (S5).

On the basis of the traveling speed V and the yaw rate ω thus detected, and on the basis of the distance d between the vehicle center and the driving wheels 40, 41 and the radius r of the driving wheels 40, 41, the rotational speed estimator 101 estimates the actual rotational speed in accordance with Math. 2 above (S6).

It is then determined whether the estimated actual rotational speed matches the target rotational speed (S7). If it is determined that the estimated actual rotational speed matches the target rotational speed, the vehicle 1 keeps traveling autonomously, with the determined operated amount. If the actual rotational speed does not match the target rotational speed, the vehicle 1 might go off the determined travel path.

If it is determined that the actual rotational speed does not match the target rotational speed, a difference between the actual rotational speed and the target rotational speed is calculated (S8). In order to bring the difference closer to zero, the corrector 102 determines the amounts of correction for the actuators 70, 71, respectively, on the basis of the difference and the correlation map (S9). At this time, the amount of correction represents a corrected amount by which the actuator 7 is operated. The processing in S4 to S6 is then executed again on the basis of the amount of correction (S10), and it is determined whether the corrected actual rotational speed matches the target rotational speed (S11).

If it is determined that the corrected actual rotational speed matches the target rotational speed, the vehicle 1 travels autonomously, at the determined amounts of correction. If it is determined that the corrected actual rotational speed does not match the target rotational speed, the processing in S8 to S11 is repeated until the actual rotational speed matches the target rotational speed. In the control circuit 10 according to the present embodiment, the processing in S2 to S11 is repeated instantaneously while the vehicle 1 is traveling.

In the present embodiment, the amount of correction is determined on the basis of any one of proportional control (P control), a combination of proportional control and integral control (PI control), a combination of proportional control and differential control (PD control), and a combination of proportional control, integral control, and differential control (PID control). Such control is incorporated in a program implementing the corrector 102 in the control circuit 10. Gains determined in these types of control may be set as appropriate, on the basis of a plurality of test runs of the vehicle 1; or it is also possible to use numerical values established on the basis of test runs of another vehicle. By using these types of control, it is possible to bring the actual rotational speed closer to the target rotational speed in a shorter time period while suppressing an overshoot in the actual rotational speed.

In the present embodiment, the correlation map is updated by the updater 105 in the control circuit 10. Specifically, the correlation map is updated on the basis of the correlation between the operated amount having been corrected by the corrector 102, and the actual rotational speed. In other words, the correlation map is updated in such a manner that the actual rotational speed estimated on the basis of a predetermined operated amount becomes equal to the target rotational speed.

A mismatch between the target rotational speed and the actual rotational speed while the vehicle 1 is traveling is caused by, for example, an error in the position where the actuators 70, 71 are attached to the respective manipulators 80, 81. The mismatch resultant of such an error can occur steadily during traveling of the vehicle 1. It is therefore preferable to avoid correcting the amount by which the actuator is operated, every time when there is a mismatch, which occurs steadily, from the viewpoint of improving the accuracy of the automatic driving of the vehicle 1.

In the present embodiment, because the updater 105 updates the correlation map on the basis of the actual rotational speed and the amount of correction, it is possible to suppress the mismatch between the actual rotational speed and the target rotational speed, which may occur steadily.

By estimating the actual rotational speed on the basis of the traveling speed and the yaw rate in the manner described above, the vehicle 1 can travel autonomously without mounting any rotational speed sensor on the driving wheels 4.

With the vehicle 1 according to the present embodiment, following advantageous effects are achieved.

(1) A vehicle 1 includes:

a speed detector that detects a traveling speed of the vehicle 1 in a horizontal direction;

a yaw rate detector that detects a yaw rate about a vertical direction of the vehicle 1;

a driving source 5;

a left driving wheel 40 and a right driving wheel 41 to which a driving force from the driving source 5 is transmitted, and that rotate independently from each other; and a control circuit 10 including a rotational speed estimator 101 that estimates an actual rotational speed of the left driving wheel 40 and an actual rotational speed of the right driving wheel 41, based on the traveling speed detected by the speed detector, and the yaw rate detected by the yaw rate detector.

As a result, the actual rotational speed of the left driving wheel 40 and the actual rotational speed of the right driving wheel 41 are estimated on the basis of the traveling speed and the yaw rate. Therefore, it is not necessary to mount a rotational speed sensor either on the left driving wheel 40 or the right driving wheel 41, in a configuration in which the vehicle 1 is travels autonomously on the basis of the rotational speed of the driving wheel 4. Hence, it is possible to reduce the cost of the vehicle 1.

Usually, a rotational speed sensor is mounted on the side surface of the driving wheel. In such a configuration, when the utility vehicle or the like moves, some object such as a stone on the ground may hit the rotational speed sensor; or grass, mud, or the like may become attached to the rotational speed sensor. As a result, the function of the rotational speed sensor may become impaired, and the rotational speed sensor may fail to detect the rotational speed of the driving wheel accurately. In this manner, when the rotational speed sensor is used in detecting the rotational speed of the driving wheel, various types of disturbance may prohibit the detection of the rotational speed. Therefore, even with the use of a rotational speed sensor, it may not be possible to detect the actual rotational speed of the driving wheel accurately. The actual rotational speed estimated by the present disclosure is not easily affected by various types of disturbance that can affect a rotational speed sensor. Therefore, the actual rotational speed can be estimated highly accurately, compared with a configuration in which the rotational speed sensor is used.

(2) The vehicle 1 further includes:

a position information obtainer 11 that obtains position information of at least two different locations of the vehicle 1 in the horizontal direction; and an Inertial Measurement Unit 12 that detects an angular acceleration about the vertical direction of the vehicle 1, in which the position information obtainer 11 serves as the speed detector, and the Inertial Measurement Unit 12 serves as the yaw rate detector.

As a result, the actual rotational speeds of the left driving wheel 40 and the right driving wheel 41 are estimated by the position information obtainer 11 that is suitable for detecting the traveling speed, and the Inertial Measurement Unit 12 that is suitable for detecting the yaw rate. Therefore, the actual rotational speeds are estimated highly accurately.

(3) The vehicle 1 rotates about the vertical direction based on a difference between the actual rotational speed of the left driving wheel and the right actual rotational speed of the right driving wheel, the position information obtainer 11 includes a first obtainer 110 that obtains first position information, a second obtainer 111 that obtains second position information, and a processor 112 that detects a traveling direction of the vehicle 1 based on the first position information and the second position information, the first obtainer 110 is provided at a rotation center of the vehicle 1, and the second obtainer 111 is provided at a position separated from the first obtainer 110 in the horizontal direction.

Because the first obtainer 110 is provided at the rotation center, the first obtainer 110 is used in detecting the traveling speed of the vehicle 1. Because the second obtainer 111 is provided at a position separated from first obtainer 110, it is possible to detect the traveling direction of vehicle 1 highly accurately. Furthermore, because two pieces of position information are processed by one processor 112, it is less likely for the position information to include noise, compared with a configuration in which the individual pieces of position information are processed individually.

(4) The first obtainer 110 and the second obtainer 111 are installed at the same height in the vertical direction of the vehicle 1.

As a result, even if the vehicle 1 becomes inclined frontwards, backwards, leftwards, or rightwards while the vehicle 1 is traveling, it is possible to detect the traveling speed and the traveling direction more accurately.

(5) The vehicle 1 includes a seat 14 on which an operator is seated, and the position information obtainer 11 is provided above the seat 14.

Because the position information obtainer 11 is provided above the seat 14, it is possible to receive a signal from a GPS satellite or the like more accurately, so that the traveling speed and the traveling direction of the vehicle 1 can be detected highly accurately.

(6) The vehicle 1 includes:

a left manipulator 80 and a right manipulator 81 that control the actual rotational speed of the left driving wheel and the right actual rotational speed of the right driving wheel, respectively;

a left actuator 70 and a right actuator 71 that actuate the left manipulator 80 and the right manipulator 81, respectively, in which the control circuit 10 includes:

an operated amount controller 100 that controls an operated amount based on a correlation map between a rotational speed of the driving wheels 4 and the operated amount of the actuator 7, so that the actual rotational speed becomes a predetermined target rotational speed; and a corrector 102 that calculates a difference between the actual rotational speed and the target rotational speed, and that corrects the operated amount so as to bring the actual rotational speed closer to the target rotational speed.

As a result, in the automatic driving using the actuator 7, with the actual rotational speed estimated by the rotational speed estimator 101, the difference between the actual rotational speed and the target rotational speed can be corrected. Therefore, the vehicle 1 can travel autonomously highly accurately.

(7) The corrector 102 corrects the operated amount, on the basis of any one of proportional control (P control), a combination of proportional control and integral control (PI control), a combination of proportional control and differential control (PD control), and a combination of proportional control, integral control, and differential control (PID control).

As a result, it is possible to bring the actual rotational speed close to the target rotational speed in a shorter time while suppressing an overshoot in the actual rotational speed.

(8) The control circuit 10 includes an updater 105 that updates the correlation map based on a correlation between the operated amount corrected by the corrector 102 and the actual rotational speed.

As a result, for example, it is possible to suppress a steady mismatch between the actual rotational speed and the target rotational speed, the mismatch being resultant of a deviation in the position where the actuators 70, 71 are attached to the respective manipulators 80, 81.

A first modification of the present embodiment will now be described. Parts that are different from those in the embodiment described above will be explained.

The vehicle 1 according to the first modification is provided with the position information obtainer 11, and does not have the Inertial Measurement Unit 12. That is, in the first modification, the position information obtainer 11 is capable of functioning as a speed detector and a yaw rate detector of the vehicle 1.

Specifically, the processor 112 in the position information obtainer 11 detects the yaw rate of the vehicle 1 on the basis of a time-series change in the detected traveling direction. For example, when the traveling direction is turned to the right by 5 degrees in 0.5 seconds, the processor 112 can detect a yaw rate as 10 degrees per second. The rotational speed estimator 101 in the control circuit 10 estimates the actual rotational speed on the basis of the traveling speed and the yaw rate detected by the position information obtainer 11.

Because the yaw rate is detected on the basis of a predetermined time-series change in the traveling direction, this configuration is less responsive, compared with the configuration in which the yaw rate is detected by the Inertial Measurement Unit 12. However, because the vehicle 1 according to the first modification does not have the Inertial Measurement Unit 12, the vehicle 1 according to the first modification has advantages that the vehicle 1 can be simplified, and the cost of the vehicle 1 can be reduced.

According to the first modification of the present embodiment, the vehicle 1 includes:

a position information obtainer 11 that obtains position information of at least two different locations of the vehicle 1 in the horizontal direction; and the position information obtainer 11 serves as the speed detector and the yaw rate detector.

Because the traveling speed and the yaw rate can thus be detected only with the use of the position information obtainer 11, the actual rotational speeds of the left driving wheel 40 and the right driving wheel 41 can be estimated with a simple structure at a low cost.

A second modification of the present embodiment will now be described.

The vehicle 1 according to the second modification is provided with the Inertial Measurement Unit 12, and does not have the position information obtainer 11. That is, in the second modification, the Inertial Measurement Unit 12 is capable of functioning as a speed detector and a yaw rate detector of the vehicle 1.

Specifically, the Inertial Measurement Unit 12 according to the second modification is incorporated with a sensor that measures an acceleration in the front-rear direction of the vehicle 1, and a sensor that measures an angular acceleration in the left-right direction of the vehicle 1. That is, the Inertial Measurement Unit 12 according to the second modification can detect the acceleration and the angular acceleration of the vehicle 1.

The detector 103 in the control circuit 10 detects the traveling speed and the yaw rate of the vehicle 1 in the horizontal direction, by calculating an integral of each of the time-series in the accelerations and angular accelerations measured by the Inertial Measurement Unit 12. The rotational speed estimator 101 in the control circuit 10 estimates the actual rotational speed on the basis of the detected traveling speed and yaw rate.

Note that the acceleration sensor may measure the acceleration in the up-to-down direction and/or the right-to-left direction of the vehicle 1, and the angular acceleration sensor may measure the angular acceleration in the up-to-down direction and/or the front-back direction of the vehicle 1. In such a case, the detector 103 may further detect the speeds in the up-to-down direction and/or the right-to-left direction of the vehicle 1, and/or the angular velocity in the up-to-down direction and/or the front-back direction of the vehicle 1.

Because the traveling speed thus detected may include some errors resultant of calculating the integral of the acceleration, the traveling speed is less accurate, compared with a configuration in which the traveling speed is detected by the position information obtainer 11. However, because the vehicle 1 according to the second modification does not have the position information obtainer 11, the vehicle 1 according to the second modification has advantages that the vehicle 1 can be simplified, and the cost of the vehicle 1 can be reduced.

According to the second modification of the present embodiment, the vehicle 1 includes an Inertial Measurement Unit 12 that detects acceleration in a horizontal direction of the vehicle 1, and an angular acceleration about the vertical direction of the vehicle 1, and the Inertial Measurement Unit 12 serves as the speed detector and the yaw rate detector.

Because the traveling speed and the yaw rate can thus be detected only with the use of the Inertial Measurement Unit 12, the actual rotational speeds of the left driving wheel 40 and the right driving wheel 41 can be estimated with a simple structure at a low cost.

Note that the vehicle 1 according to the present disclosure is not limited to the configurations according to the embodiments described above, and various modifications are still possible.

The transmission 6 may be another type of transmission. The vehicle 1 according to the present embodiment is engine-driven, but may also be motor-driven.

The vehicle 1 may be caused to travel by an operator manually operating the manipulator 8, directly. Furthermore, the vehicle 1 may be caused to travel by causing the actuator 7 to operate indirectly, by an operator operating a joystick that is electrically connected to the actuator 7.

The second obtainer 111 may be provided in front of vehicle 1, e.g., above the lawn mowing units 9, above the front wheels 3, or above the driving source 5, among the positions on vehicle body 2.

The processor may be provided in a plurality, correspondingly to the first obtainer 110 and the second obtainer 111.

It is also possible for the vehicle not to be an autonomous vehicle. Furthermore, when the vehicle is an autonomous vehicle, the vehicle may be an unmanned autonomous vehicle having no operator thereon.

It is also possible for the vehicle to make a turn by steering, not on the basis of the difference in the rotational speeds of the left driving wheel and the right driving wheel.

The correction amount control method may be another control method. Control methods such as two-degree-of-freedom control, optimum control, adaptive control, predictive control, robust control, and model predictive control may also be used.

What is claimed is:

1. A vehicle comprising:

a speed detector that detects a traveling speed of the vehicle in a horizontal direction;

a yaw rate detector that detects a yaw rate about a vertical direction of the vehicle;

a driving source;

a left driving wheel and a right driving wheel to which a driving force from the driving source is transmitted, and that rotate independently from each other; and a control circuit including a rotational speed estimator that estimates, without using a rotational speed sensor, an actual rotational speed of the left driving wheel and an actual rotational speed of the right driving wheel, based on the traveling speed detected by the speed detector, and the yaw rate detected by the yaw rate detector.

2. The vehicle according to claim 1, further comprising:

a position information obtainer that obtains position information of at least two different locations of the vehicle in the horizontal direction; and an Inertial Measurement Unit that detects an angular acceleration about the vertical direction of the vehicle, wherein the position information obtainer serves as the speed detector, and the Inertial Measurement Unit serves as the yaw rate detector.

3. The vehicle according to claim 2, wherein the vehicle rotates about the vertical direction based on a difference between the actual rotational speed of the left driving wheel and the actual rotational speed of the right driving wheel, the position information obtainer includes a first obtainer that obtains first position information, a second obtainer that obtains second position information, and a processor that detects a traveling direction of the vehicle based on the first position information and the second position information, the first obtainer is provided at a rotation center of the vehicle, and the second obtainer is provided at a position separated from the first obtainer in the horizontal direction.

4. The vehicle according to claim 3, wherein the first obtainer and the second obtainer are installed at same height in the vertical direction of the vehicle.

5. The vehicle according to claim 2, further comprising a seat on which an operator is seated, and the position information obtainer is provided above the seat.

6. The vehicle according to claim 1, further comprising a position information obtainer that obtains position information of at least two different locations of the vehicle in the horizontal direction, and the position information obtainer serves as the speed detector and the yaw rate detector.

7. The vehicle according to claim 6, wherein the vehicle rotates about the vertical direction based on a difference between the actual rotational speed of the left driving wheel and the actual rotational speed of the right driving wheel, the position information obtainer includes a first obtainer that obtains first position information, a second obtainer that obtains second position information, and a processor that detects a traveling direction of the vehicle based on the first position information and the second position information, the first obtainer is provided at a rotation center of the vehicle, and the second obtainer is provided at a position separated from the first obtainer in the horizontal direction.

8. The vehicle according to claim 6, further comprising a seat on which an operator is seated, and the position information obtainer is provided above the seat.

9. The vehicle according to claim 1, further comprising an Inertial Measurement Unit that detects acceleration in a horizontal direction of the vehicle, and an angular acceleration about the vertical direction of the vehicle, and the Inertial Measurement Unit serves as the speed detector and the yaw rate detector.

10. The vehicle according to claim 1, further comprising:

a left manipulator and a right manipulator that control the actual rotational speed of the left driving wheel and the actual rotational speed of the right driving wheel, respectively;

a left actuator and a right actuator that actuate the left manipulator and the right manipulator, respectively, wherein the control circuit includes:

an operated amount controller that controls an operated amount based on a correlation map between a rotational speed of the driving wheels and the operated amount of the actuator, so that the actual rotational speed becomes a predetermined target rotational speed; and a corrector that calculates a difference between the actual rotational speed and the target rotational speed, and that corrects the operated amount so as to bring the actual rotational speed closer to the target rotational speed.

11. A method for estimating an actual rotational speed of a left driving wheel of a vehicle and an actual rotational speed of a right driving wheel of the vehicle, comprising:

obtaining traveling speed information of the vehicle in a horizontal direction;

obtaining yaw rate information about a vertical direction of the vehicle; and estimating, without using a rotational speed sensor, the actual rotational speed of the left driving wheel and the actual rotational speed of the right driving wheel, based on the traveling speed information and the yaw rate information;

controlling the vehicle based on the estimated actual rotational speed of the left driving wheel and the estimated actual rotational speed of the right driving wheel.

* * * * *